United States Patent [19]

Matzo

[11] Patent Number: 5,307,566

[45] Date of Patent: May 3, 1994

[54] ARRESTING DEVICE

[75] Inventor: David Matzo, Leinfelden-Echterdingen, Fed. Rep. of Germany

[73] Assignee: Robert Bosch GmbH, Stuttgart, Fed. Rep. of Germany

[21] Appl. No.: 994,146

[22] Filed: Dec. 21, 1992

[30] Foreign Application Priority Data

Dec. 20, 1991 [DE] Fed. Rep. of Germany ....... 4142282

[51] Int. Cl.$^5$ .............................................. F16B 35/00
[52] U.S. Cl. .................................... 30/371; 411/366; 411/424; 411/437; 411/554
[58] Field of Search .................. 30/371, 386, 385; 411/366, 411, 414, 424, 349, 554, 553, 555, 437, 999, 965, 231

[56] References Cited

U.S. PATENT DOCUMENTS

| | | | |
|---|---|---|---|
| 2,527,251 | 10/1950 | Gorden | 30/385 |
| 2,630,020 | 3/1953 | Juy | 411/366 |
| 4,026,020 | 5/1977 | Hoppner et al. | 30/386 |

Primary Examiner—Richard K. Seidel
Assistant Examiner—Hwei-Siu Payer
Attorney, Agent, or Firm—Michael J. Striker

[57] ABSTRACT

An arresting device for force-transmitting fixing of two relatively movable parts, particularly for cutting angle or cutting depth adjustment of electric hand saws, the arresting device has a pin having a radially extending pressing surface for pressing against one of the parts, a clamping element having a pressing surface for pressing against another of the parts and arranged on the pin so that by a relative turning of the clamping element and the pin the pressing surfaces are moved toward one another for producing a clamping and from one another for releasing the clamping. The clamping element is formed as a hand lever having a clamping sleeve and a lever arm extending from the clamping sleeve. The clamping sleeve is turnably arranged on the pin and has a clamping collar extending over the lever arm and provided with a ring-shaped end surface forming the pressing surface of the clamping element. The pin has an outer peripheral surface provided with at least one depressed cam path having a path starting portion at a free pin end and a path end facing the pressing surface of the pin. The cam path has a pitch which starting from the path starting portion reduces in a peripheral direction toward and to the path end. A a guiding pin extends radially in the clamping sleeve and engages in the at least one cam path.

17 Claims, 1 Drawing Sheet

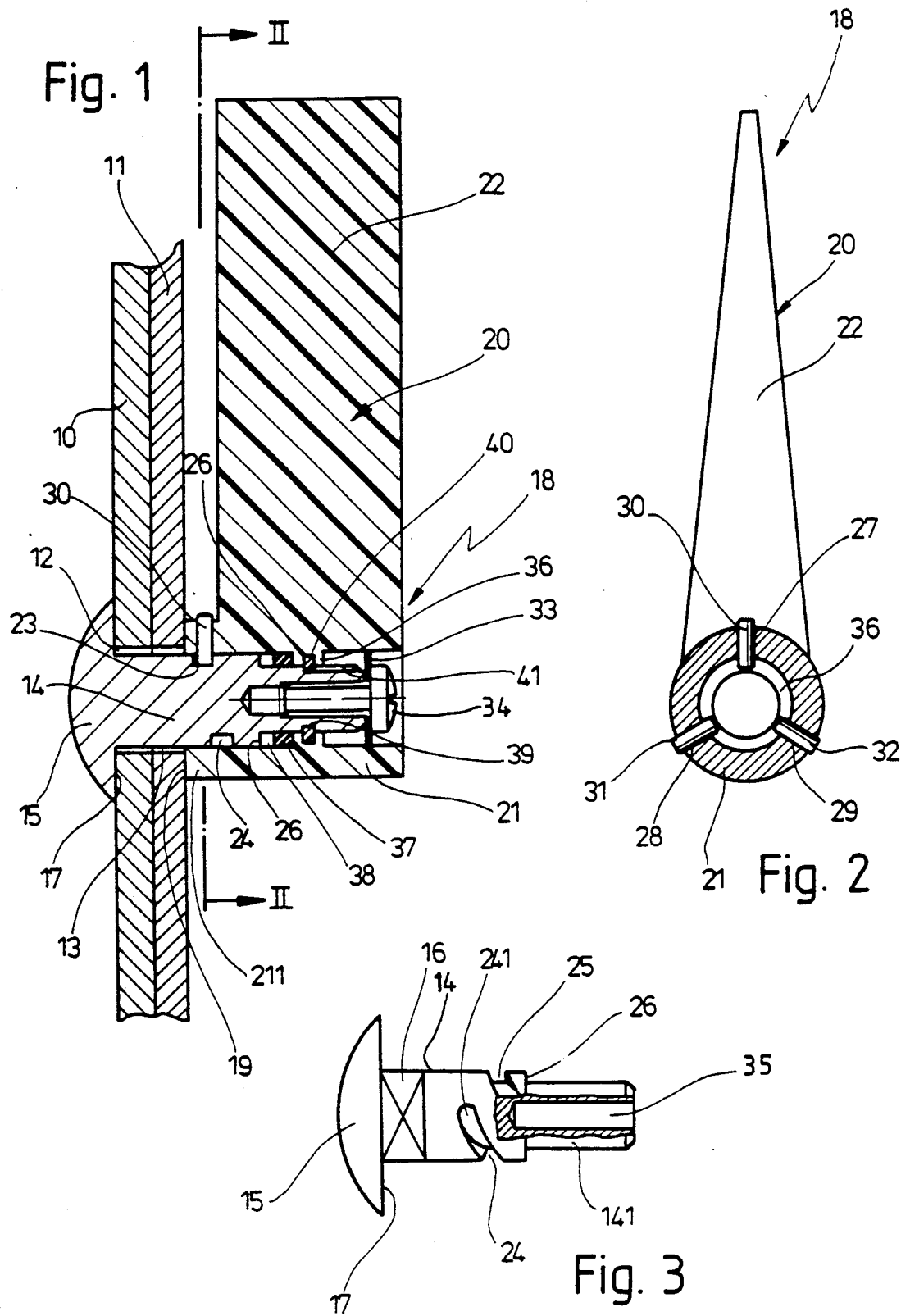

ARRESTING DEVICE

BACKGROUND OF THE INVENTION

The present invention relates to an arresting device for force-transmitting clamping of two relatively movable parts, in particular for adjusting the cutting angle or the cutting depth of electric hand saws.

Arresting or fixing devices of this type are known in the electric hand saw machines. In such devices the pin is formed as a threaded head screw and the clamping element is formed as a wing nut. The threaded head screw extends through a polygonal opening in a tongue connected with the machine housing and through a slot in a sheet piece which is fixedly connected with the supporting and guiding carriage of the machine. The tongue and the sheet piece are located on one another and pressed against one another by the screw head and the wing screw in a force-transmitting manner. After releasing of the wing screw both parts can be displaced relative to one another for turning the guiding carriage and thereby for adjustment of the cutting depth or the cutting angle. By tightening the wing nut the clamping connection is further produced and the guiding carriage is immovably fixed on the machine housing. For producing the clamping action the wing screw must perform several revolutions and finally firmly tightened to prevent the displacement of the guiding carriage during the operation with the hand circular saw.

SUMMARY OF THE INVENTION

Accordingly, it is an object of the present invention to provide an arresting device which avoids the disadvantages of the prior art.

In keeping with these objects and with others which will become apparent hereinafter, one feature of the present invention resides, briefly stated, in an arresting device in which the clamping element is formed as a hand lever with a clamping sleeve and the one piece lever arm, the clamping sleeve is rotatably held on a pin, and has a clamping collar which extends over the lever arm and has a ring-shaped end surface forming an abutment surface, the pin has an outer peripheral surface provided with at least one depressed cam path with a path having an initial part facing the free pin end and the final part facing the pressing surface of the pin, the pitch of the cam path starting from the initial part reduced in the peripheral direction toward and close to the end portion, and at least one radial guiding pin extending in at least one cam path is held in the clamping sleeve.

When the arresting device is designed in accordance with the present invention, it has the advantage that no longer turning of the clamping element for producing and releasing the clamping connection is needed. For opening and closing the arresting device the operator must move the hand lever only around a fraction of a revolution, so that there is no limitation as to a fast arresting or fast clamping. Due to the pitch reduction at the end of the cam path, an arresting position of at least one guiding pin in the closing position of the arresting device is obtained and therefore a reliable clamping is guaranteed.

In accordance with a further embodiment of the present invention, the pin over its portion extending to its free end has a reduced diameter, and the starting portion of the path of at least one depressed cam path extends in the transition to the ring shoulder formed by the pin portion of the reduced diameter.

It is preferable when three depressed curve paths which are offset by the same peripheral angle relative to one another are formed in the pin, and all starting portions of the paths extend in the ring shoulder. Correspondingly, the clamping sleeve is provided with three guiding pins which are radially offset relative to one another by corresponding peripheral angle, and each extends in one of the cam paths. With this construction a simple mounting of the arresting device is possible.

The pins extend through both parts, and the clamping sleeve which is one piece with the handle lever is displaceable on the pins. The guiding pins extending in the interior of the sleeve are inserted in the region of the ring shoulder into the cam paths.

In accordance with a further embodiment of the present invention, in order to prevent an undesirable dismounting of the arresting device by removing the guiding pin from the cam paths during the operation, an abutment is provided on the pin and a counter-abutment is provided on the clamping sleeve, so as to cooperate with one another for limiting the axial displacement movement. The arrangement of the abutment and the counter-abutment is selected so that with a maximum displacement stroke of the clamping sleeve on the pin the guiding pin does not reach the starting portion of the path and cannot be withdrawn from the cam path.

Preferably, the abutment and the counter-abutment are formed by a disc which is mounted on the pin end and an annular collar provided in the interior of the sleeve and extending in the radial direction. The dimensions of the ring collar and the disc are selected so that the disc is freely movable in the interior of the sleeve and can abut against the facing ring surface of the ring collar.

In accordance with a further embodiment of the present invention the hand lever is prestressed by a spring in direction of the feed movement of the arresting device. Thereby the releasing hand lever of the clamping sleeve slightly abuts against the part to be clamped. This facilitates the fine adjustment of the relative position of the part to be clamped.

In accordance with a further advantageous embodiment of the present invention, the spring tensioning of the hand lever is performed by a torsion or leg spring collar of the clamping sleeve, which is connected on the one hand with a clamping sleeve and on the other hand with the pin and is pretensioned in direction of the feed movement of the hand lever.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a longitudinal section of an arresting device in accordance with the present invention;

FIG. 2 is a view showing a section of the hand lever of the arresting device taken along the line II—II in FIG. 1; and FIG. 3 is a perspective view of a pin of the arresting device of FIG. 1, partially sectioned.

DESCRIPTION OF THE PREFERRED EMBODIMENTS

An arresting and fixing device shown in FIG. 1 serves for force-transmitting clamping of two parts 10 and 11 which can be displaced relative to one another. In the shown example the part 10 can be a tongue which is fixedly connected with the machine housing of an electric hand circular saw, while the part 11 can be a curved member fixedly connected with the supporting and guiding carriage of the machine. By displacement of the curved member relative to the tongue which in FIG. 1 is performed in direction of the drawing sheet depth, the guiding carriage of the machine can be inclined around a turning axis and thereby the cutting depth of the saw blade can be adjusted.

For receiving the arresting device the part 10 (the tongue) has a four-cornered opening 12 and the part 11 (the sheet piece) has a longitudinally extending curved slot 13. A pin 14 with a pin head 15 of the arresting device extends through the opening 12 and the slot 13. A perspective view of the pin 14 with the pin head 15 on a side view is shown in FIG. 3. It can be seen that the pin 14 is flattened at both sides or formed as a square in the small pin region 16 located immediately near the pin head 15. The size of the pin region 16 corresponds to the size of the four-cornered opening 12 in the part 10 so that the pin 14 is non-rotatably held in the part 10. The lower side of the pin head 15 which is formed as a round head, forms a pressing surface 17 for pressing against the part 10 during closing of the arresting device.

A clamping element 18 of the arresting device serves for producing the force-transmitting clamping connection. The clamping element 18 is arranged on the pin 14 and formed so that during turning on the pin 14 it is displaced axially and presses with its pressing surface 19 against the other part 11. The clamping element 18 is formed as a hand lever 20 with a clamping sleeve 21 and a radially projecting lever arm 22. The lever arm 22 and the clamping sleeve 21 are produced as a one-piece synthetic plastic part. The clamping sleeve 21 projects with a short clamping collar 211 beyond the lever arm 22, and a ring-shaped end surface of the clamping collar 211 forms the pressing surface 19.

In order to perform the combined axial-/rotary movement of the handle lever 20 on the pin 14, the pin 14 is provided on its outer periphery with three depressed cam paths 23, 24, 25 which are offset relative to one another by a peripheral angle of correspondingly 120°. A ring shoulder 26 is formed on the pin 14 by a diameter reduction of the rear pin portion 141 which extends to the free end of the pin. A starting portion of the cam paths 23-25 extends from the ring shoulder 26. The three cam paths 23, 24, 25 extend from the starting portion of the path to the pin head 15. Their pitch first increases in the peripheral direction and again decreases at the end of the path. This can be clearly recognized in FIG. 3 for the cam path 24. The path end portion 241 extends substantially perpendicularly to the pin axis.

As can be seen from FIG. 2, three radial openings 27, 28, 29 are arranged in the clamping sleeve 21 and offset relative to one another by 120° in a peripheral direction. A guiding pin 30, 31, 32 is inserted in the radial openings 27, 28, 29 so that it projects radially into the interior of the sleeve. As can be seen from FIG. 1, each guiding pin 30, 31, 32 in the assembled arresting device extends into the cam path 23, 24, 25. Therefore, by turning of the clamping sleeve 21 it is displaced by the guiding pins 30, 31, 32, along the cam paths 23, 24, 25 and therefore the pin 14 is moved axially.

For preventing the release of the guiding pin 30 32 from the cam path 23-25, a radially extending disc 33 with a lens screw 34 is mounted on a free end of the pin 14 and is screwed in an axial blind hole 35 which opens at the end surface as can be seen in FIG. 3. The outer diameter of the disc 33 can be somewhat smaller than the diameter of the clamping sleeve 21, so that the disc 33 together with the pin 14 can displace inside the clamping sleeve 21. A ring collar 36 extends radially from the inner wall of the sleeve substantially in the center of the clamping sleeve 21. The inner diameter of the ring collar 36 is somewhat greater than the outer diameter of the diameter-reduced pin portion 141. Therefore, the pin with its pin portion 141 can slide through the ring collar 36. The disc 33 and the ring collar 36 cooperate as an abutment and a counterabutment. Their arrangement is selected so that during the maximum stroke of the clamping sleeve 21 on the pin 14 in direction of opening of the arresting device, the guiding pins 30-32 do not reach the ring shoulder 26 and thereby cannot be withdrawn from the cam paths 23-25 which open there. In the assembled condition of the arresting device, a rubber disc 37 and a compensating disc 38 are arranged between the ring shoulder 26 and the facing end surface of the ring collar 36, for adjusting the clamping stroke of the hand lever 22. The ring collar 36 carries a ring groove 39 which receives a torsion spring 40 formed as a leg spring. The spring abuts at one side against the clamping sleeve 21 and on the other side against the pin 14 and thereby urges the hand lever 20 to turn in the clockwise direction in FIG. 1. Since the hand lever 20 is prestressed, during releasing it slightly abuts against the clamping part 11. By further turning of the hand lever 20 it is positioned in its end position. The guiding pins 30-32 engage in the path end of the respective cam paths 23-25, and are there reliably arrested due to the reducing pitch of the cam path 23-25 of the pin 14.

For mounting of the arresting device, the pin 14 extends through the four cornered opening 12 in the part 10 and through the slot 13 in the part 11. Then the compensating disc 38 and the rubber disc 37 are displaced on the diameter-reduced pin portion 141 of the pin 14 in the above mentioned sequence. The torsion spring 40 is inserted in the ring groove 39 in the ring collar 36 of the clamping sleeve 21 and then the hand lever 20 is fitted with the clamping sleeve 21 on the pin 14. The hand lever 20 is held in such a position that the guiding sleeves 30-32 extending in the interior of the sleeve can engage in the cam path 23-25 which open in the region of the ring shoulder 26. During the displacement of the clamping sleeve 21 of the pin 14 the pin-side end of the torsion spring 40 slides in an axial groove 41 which opens at the pin end. With the displacement of the hand lever 20 the torsion spring 40 is fixed and prestressed at the end side on the pin 14. Then the disc 33 is fitted on the lens screw 34 and the lens 34 is screwed in the blind hole 35.

The present invention is not limited to the above described embodiment. The described arresting device has many possibilities to be used and can be utilized not only for hand circular saws but also in all cases when two parts movable relative to one another must be selectively fixed or freely moved. The parts must not perform necessarily a displacement movement, but instead they can turn relative to one another. The torsion spring 40 for producing the torque at the hand lever 20, which urges it in direction of closing of the arresting device, can be formed in a different manner as well.

It will be understood that each of the elements described above, or two or more together, may also find a useful application in other types of constructions differing from the types described above.

While the invention has been illustrated and described as embodied in an arresting device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arresting device for force-transmitting fixing of two relatively movable parts, comprising a pin having a radially extending pressing surface for pressing against one of the parts; a clamping element having a pressing surface for pressing against another of the parts and arranged on said pin so that by a relative turning of said clamping element and said pin said pressing surfaces are moved toward one another for producing a clamping and moved away from one another for releasing the clamping, said clamping element being formed as a hand lever having a clamping sleeve and a lever arm extending from said clamping sleeve, said clamping sleeve being turnably arranged on said pin and having a clamping collar extending over said lever arm and provided with a ring-shaped end surface forming said pressing surface of said clamping element, said pin having an outer peripheral surface provided with at least one depressed cam path having a path starting portion at a free pin end and a path ending portion facing said pressing surface of said pin, said cam path having a pitch which starting from said path starting portion reduces in a peripheral direction toward and to said path ending portion; and a guiding pin extending radially in said clamping sleeve and engaging in said at least one cam path.

2. An arresting device as defined in claim 1, wherein said clamping sleeve and said lever arm are formed as a one-piece element.

3. An arresting device as defined in claim 1, wherein said pin has a pin portion which extends to said free pin end and has a reduced diameter, said pin having a ring shoulder formed at a transition to said pin portion of reduced diameter, said path starting portion of said at least one cam path exiting at said ring shoulder.

4. An arresting device as defined in claim 1, wherein said pin has an abutment, said sleeve having a counter-abutment which cooperates in said abutment for limiting an axial displacement path of said hand lever on said pin, said abutment and said counter-abutment being arranged so that said guiding pin cannot disengage on said path starting portion from said cam path.

5. An arresting device as defined in claim 4, wherein said pin has a pin portion which extends to said free pin end and has a reduced diameter, said counter-abutment is formed as a ring collar extending radially in an interior of said clamping sleeve and having an inner diameter which is greater than an outer diameter of said pin portion of reduced diameter, said abutment being formed by a disc mounted on said free pin end and having an outer diameter which is somewhat smaller than an inner diameter of said clamping sleeve.

6. An arresting device as defined in claim 5, wherein said pin has an axial blind hole; and further comprising a screw which fixes said disc on said pin end and is screwed in said axial blind hole.

7. An arresting device as defined in claim 4, wherein said pin has a pin portion which extends to said free pin end and has a reduced diameter, said counter-abutment is formed as a ring collar, said abutment is formed as a ring shoulder; and further comprising a rubber disc and a compensating disc arranged on said pin portion which has a reduced diameter and is supported between said ring collar and said ring shoulder of said pin.

8. An arresting device as defined in claim 1, and further comprising a spring arranged between said lever and said pin and producing a torque on said hand lever which provides for a relative turning of said hand lever and said pin in direction of a feed movement for providing a clamping connection.

9. An arresting device as defined in claim 8, wherein said clamping sleeve has a counter-abutment formed as a ring collar provided with a ring groove in which said spring is arranged, said spring being mounted on said clamping sleeve and on said pin and pretensioned.

10. An arresting device as defined in claim 9, wherein said spring is a torsion spring.

11. An arresting device as defined in claim 1, wherein said clamping collar of said clamping sleeve has a radial opening, said guiding pin engaging in said radial opening and is mounted in it.

12. An arresting device as defined in claim 1, wherein said clamping sleeve has three such guiding pins which are offset relative to one another by an identical peripheral circumferential angle and are located in a same cross-sectional plane of said clamping sleeve, said pin having three such cam paths which are offset relative to one another by a corresponding circumferential angle, said path starting portions of said cam paths and said path ends of said cam paths are located in a common cross-sectional plane of said pin.

13. An arresting device as defined in claim 1, wherein said pressing surface of said pin is formed by a pin head which is provided on said pin, said pin extending through openings formed in the parts to be clamped.

14. An arresting device as defined in claim 13, wherein said pin head is of one piece with said pin.

15. An arresting device as defined in claim 13, wherein said pin in a small region located near said pin head is provided with a formation which prevents turning and is received in form-corresponding manner in one of the parts against which said pin head presses.

16. An arresting device as defined in claim 15, wherein said formation is formed as two flattenings located opposite to one another.

17. An arresting device as defined in claim 15, wherein said formation is formed as a four-cornered shape.

* * * * *